(No Model.) 2 Sheets—Sheet 1.

T. COAD.
ELECTRIC PRIMARY BATTERY.

No. 505,392. Patented Sept. 19, 1893.

Witnesses:
John C. Wilson
Roy C. Bowen

Inventor:
Theophilus Coad,
By Whitman & Wilkinson,
Attorneys.

(No Model.) 2 Sheets—Sheet 2.
T. COAD.
ELECTRIC PRIMARY BATTERY.
No. 505,392. Patented Sept. 19, 1893.
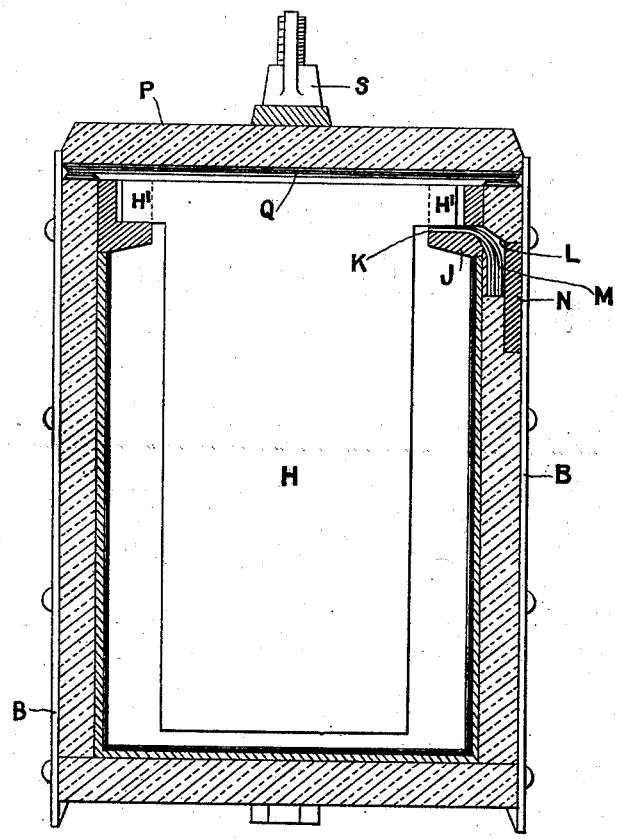
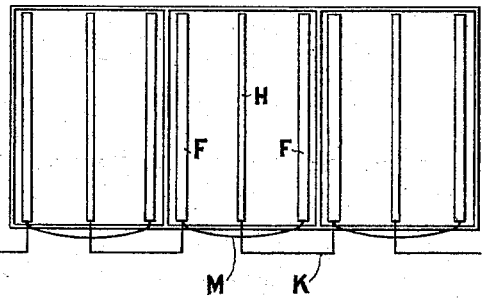
Witnesses:
John C. Wilson,
Percy C. Bowen.
Inventor,
Theophilus Coad,
By Whitman & Wilkinson,
Attorneys.

UNITED STATES PATENT OFFICE.

THEOPHILUS COAD, OF LONDON, ENGLAND.

ELECTRIC PRIMARY BATTERY.

SPECIFICATION forming part of Letters Patent No. 505,392, dated September 19, 1893.

Application filed November 10, 1892. Serial No. 451,525. (No model.)

*To all whom it may concern:*

Be it known that I, THEOPHILUS COAD, a subject of the Queen of Great Britain, residing at London, England, have invented certain new and useful Improvements in Electric Primary Batteries; and I do hereby declare the following to be a full and exact description of the invention, which will enable others skilled in the art to which it appertains to make and use the same.

This invention primarily relates to an improved manner of connecting the positive electrode to the negative, and in the arrangement of the battery cells to facilitate the same. In such arrangement the zinc is made with shoulders or projections by which it is hung in the cell, one of the projections resting upon a piece of contact wire electrically connected to the carbon, by which a perfect and continuous contact is obtained as long as the zinc rests upon the wire.

To enable my invention to be properly understood, I will proceed to describe the same with aid of the accompanying drawings, which illustrate the invention as applied to a single fluid battery.

Figure 1:
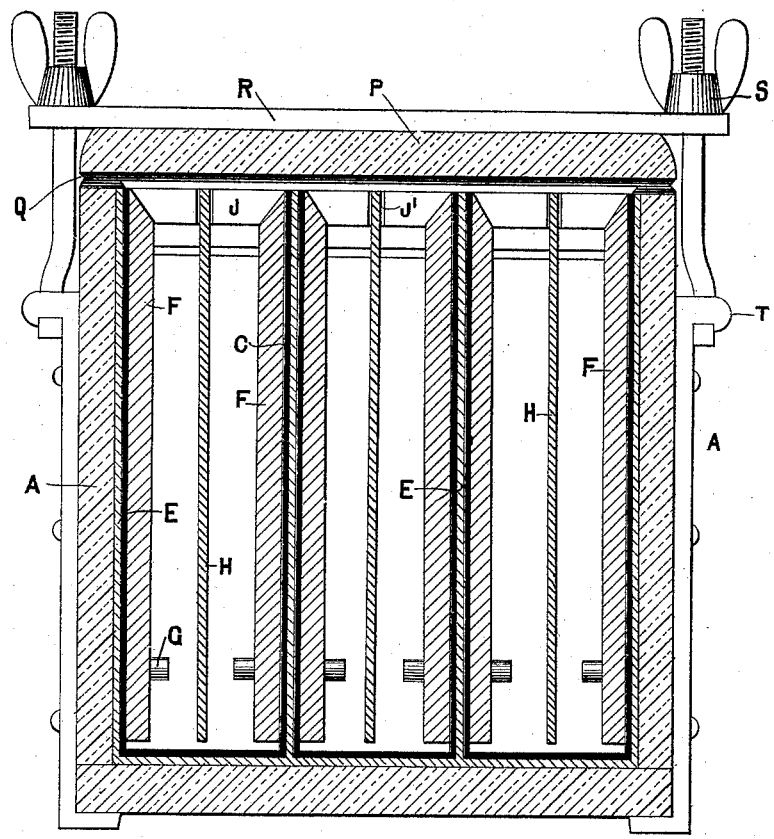
Figure 3:
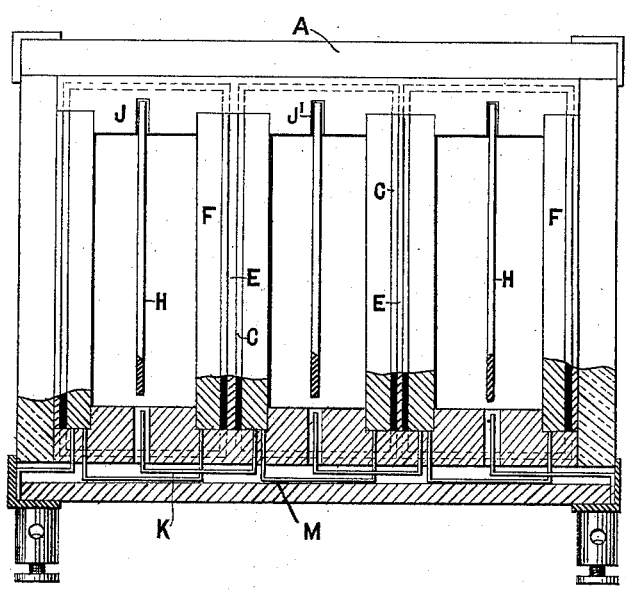

Figure 1 a sectional elevation of a battery according to this invention; Fig. 2 a sectional end view of same; Fig. 3 a plan.

A, is a case preferably of wood, and for strength has angle corners, metal corners B, screwed onto same. Within this case is secured a number of separate cells C, by intermediate cement E.

To two sides of the inside of each cell C, is attached by cement or otherwise a carbon plate F, having a stud D, near bottom of a non-conducting material to keep the zinc H, from contact.

The zinc is suspended in the following manner:—Fitting round the top of case A, is a collar of vulcanite J, with notches or recesses J′ for the zinc and carbons to be inserted; at the bottom of the notches for the zinc on one side is a contact end of a wire K, for one of the projections H′ of the zinc to rest upon when the zinc is inserted. This contact end of the wire K, is preferred to be platinum, which for economy is soldered on to copper wire. This is carried round the outside of the cells in a recess L, of the case A, and electrically connected to the carbons of the next cell, and so throughout all the cells. The carbons are connected together in each cell by a wire M, properly free and clear of the zinc wires K. This manner of connecting is best seen at Figs. 2 and 4. These connecting wires lie in the recess L, and are covered by fitted-in piece N. The top of case A, is closed by a cover P, having a layer of india rubber Q underneath. This cover is secured by a cross piece or plate of metal R, and thumb screws S, engaging hooks T, attached to side of battery.

From the above it will be readily understood that the carbons are permanently secured in their cells, and each two connected together by the wires M, and that so long as the part H′ of the zinc rests upon the end of wire K, the connection of the zinc with the carbons is certain and continuous. When a zinc is worn out, the upper portion is drawn out and a fresh zinc dropped in which connects itself when it meets and rests upon the end of wire K.

Having now described my invention, what I desire to secure by Letters Patent of the United States is—

A primary battery consisting of suitable cells, carbons secured in each cell electrically connected, the zinc formed with shoulder or projections for it to be hung by in cell, a recess to secure the zinc between the carbons and a contact point arranged at bottom of recess electrically connected to the carbons, of the next cell for one of the projections of the zinc to rest upon, substantially as described and set forth.

THEOPHILUS COAD.

Witnesses:
FREDERIC PRINCE,
WILLIAM MUIR.